(12) United States Patent
Krishnan

(10) Patent No.: US 7,359,728 B2
(45) Date of Patent: Apr. 15, 2008

(54) MODIFIED POWER CONTROL FOR REDUCTION OF SYSTEM POWER CONSUMPTION

(75) Inventor: Ranganathan Krishnan, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 865 days.

(21) Appl. No.: 10/859,411

(22) Filed: Jun. 1, 2004

(65) Prior Publication Data

US 2005/0265289 A1 Dec. 1, 2005

(51) Int. Cl.
*H04Q 7/20* (2006.01)

(52) U.S. Cl. .................................. 455/522; 455/226.3

(58) Field of Classification Search .................. 455/69, 455/522, 13.4, 574, 550.1, 127.5, 343.1, 455/343, 67.11, 115.1, 115.3, 226.2, 249.1, 455/277.2, 67.13; 370/908, 338, 332
See application file for complete search history.

(56) References Cited

U.S. PATENT DOCUMENTS

| | | | |
|---|---|---|---|
| 6,496,706 | B1 | 12/2002 | Jou et al. |
| 6,545,989 | B1 | 4/2003 | Butler |
| 6,714,597 | B1 * | 3/2004 | Antonio et al. ............. 375/296 |
| 2003/0063583 | A1 | 4/2003 | Padovani et al. |

* cited by examiner

*Primary Examiner*—Tu Nguyen
(74) *Attorney, Agent, or Firm*—Thomas R. Rouse; Donald C. Kordich (57) ABSTRACT

Systems and techniques are disclosed relating to gating transmissions in a wireless networks. Transmissions are gated based on a duty cycle. The duty cycle in turn is determined by the requirement to maintain an original application data rate $r_{initial}$ given increased transmit power.

8 Claims, 7 Drawing Sheets

CONTINUOUS TRANSMISSION

GATED TRANSMISSION

MODIFIED POWER CONTROL FOR REDUCTION OF SYSTEM POWER CONSUMPTION

BACKGROUND

1. Field

The present disclosure relates generally to wireless communications, and more specifically, to various systems and techniques for gating transmissions in wireless networks.

2. Background

Communication systems designed to allow multiple users to access a common communications medium may be based on code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In conventional wireless communications, an access network is generally employed to support communications for a number of devices. An access network is typically implemented with multiple fixed site base stations dispersed throughout a geographic region. The geographic region is generally subdivided into smaller regions known as cells. Each base station may be configured to serve the devices in its respective cell. An access network may not be easily reconfigured when there are varying traffic demands across different cellular regions.

In contrast to the conventional access network, ad-hoc networks are dynamic. An ad-hoc network may be formed when a number of wireless communication devices, often referred to as terminals join together to form a network. Terminals in ad-hoc networks can operate as either a host or router. Thus, an ad-hoc network may be easily reconfigured to meet existing traffic demands in a more efficient fashion. Moreover, ad-hoc networks do not require the infrastructure required by conventional access networks, making ad-hoc networks an attractive choice for the future.

In a conventional CDMA communications system, a subscriber station may access a network, or communicate with other subscriber stations, through one or more base stations. A subscriber station can also be called a terminal. Each base station is configured to serve all subscriber stations in a specific geographic region generally referred to as a cell. In some high traffic applications, the cell may be divided into sectors with a base station serving each sector. Each base station transmits a pilot signal which is used by the subscriber stations for synchronizing with a base station and to provide coherent demodulation of the transmitted signal once the subscriber station is synchronized to the base station. The subscriber station generally establishes a communications channel with the base station having the strongest pilot signal.

The subscriber station calculates a signal-to-noise-and-interference ratio C/I for a received forward link signal. The forward link refers to transmission from the base station to a subscriber station and the reverse link refers to transmission from the subscriber station to a base station. The subscriber station's C/I determine the data rate that can be supported for the forward link from the base station to a subscriber station. That is, a given level of performance for the forward link is achieved at a corresponding level of C/I. A method and apparatus for selecting a data rate is disclosed in U.S. Pat. No. 6,574,211 entitled "METHOD AND APPARATUS FOR HIGH RATE PACKET TRANSMISSION," issued Jun. 3, 2003, which is assigned to the assignee of the present invention.

The power at which a base station transmits data to a subscriber station is called the forward link transmit power. The forward link transmit power is at a level required for transmitting data over the forward link reliably. Likewise, the power at which a subscriber station transmits data to a base station is called the reverse link transmit power. The reverse link transmit power is at a level required for transmitting data over the reverse link reliably.

Interference to each subscriber station increases as the number of subscriber stations transmitting increases. Thus, it is desirable to control subscriber station transmit power to avoid adverse interference with other subscriber station communications.

Ultra-Wideband (UWB) is an example of a communications technology that may be implemented with ad-hoc networks. UWB provides high speed communications over a wide bandwidth. At the same time, UWB signals are transmitted in very short pulses that consume very little power. The output power of the UWB signal is so low that it looks like noise to other RF technologies, making it less interfering.

In an ad-hoc network, terminals are added dynamically. As more terminals are added, each communicating terminal creates more interference for terminals other than the terminal with which it is communicating. Thus, it is desirable to control terminal transmit power to avoid adverse interference with other terminal communications.

What is needed is a system and methods to control transmissions to not only reduce interference in a communication system, but also to reduce power consumption in the communication system.

SUMMARY

In one aspect of the present invention, a method of power control includes increasing transmit power by a delta transmit power, determining a final physical layer data rate $r_{final}$ based on the increased transmit power and system performance, determining a duty cycle based on maintaining an original application data rate given the final physical layer data rate $r_{final}$, and gating the wireless transmissions based on the duty cycle.

In another aspect of the present invention, a wireless terminal includes means for increasing transmit power by a delta transmit power, means for determining a final physical layer data rate $r_{final}$ based on the increased transmit power and system performance, means for determining a duty cycle based on maintaining an original application data rate given the final physical layer data rate $r_{final}$, and means for gating the wireless transmissions based on the duty cycle.

In yet another aspect of the present invention, a wireless terminal includes a receiver for detecting signal-to-interference-and-noise ratio (SINR), a processor for determining a duty cycle based on maintaining an original application data rate given the SINR and an increase in transmit power, the processor coupled to the receiver, and a transmitter for gating the wireless transmissions based on the duty cycle, the transmitter coupled to the baseband processor.

In a further aspect of the present invention, computer readable media embodying a program of instructions executable by a computer program, said computer readable media comprising a computer readable program code means for increasing transmit power by a delta transmit power, a computer readable program code means for determining a final physical layer data rate $r_{final}$ based on the increased transmit power and system performance, a computer readable program code means for determining a duty cycle based on maintaining an original application data rate given the final physical layer data rate $r_{final}$, and a computer readable program code means for gating the wireless transmissions based on the duty cycle.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The word "exemplary" is used exclusively herein to mean "serving as an example, instance, or illustration." Any embodiment described herein as "exemplary" is not necessarily to be construed as preferred or advantageous over other embodiments.

In the following detailed description, various aspects of the present invention may be described in the context of a UWB wireless communications system. While these inventive aspects may be well suited for use with this application, those skilled in the art will readily appreciate that these inventive aspects are likewise applicable for use in various other communication environments including convention wireless communications. Accordingly, any reference to a UWB communications system is intended only to illustrate the inventive aspects, with the understanding that such inventive aspects have a wide range of applications.

Figure 1:
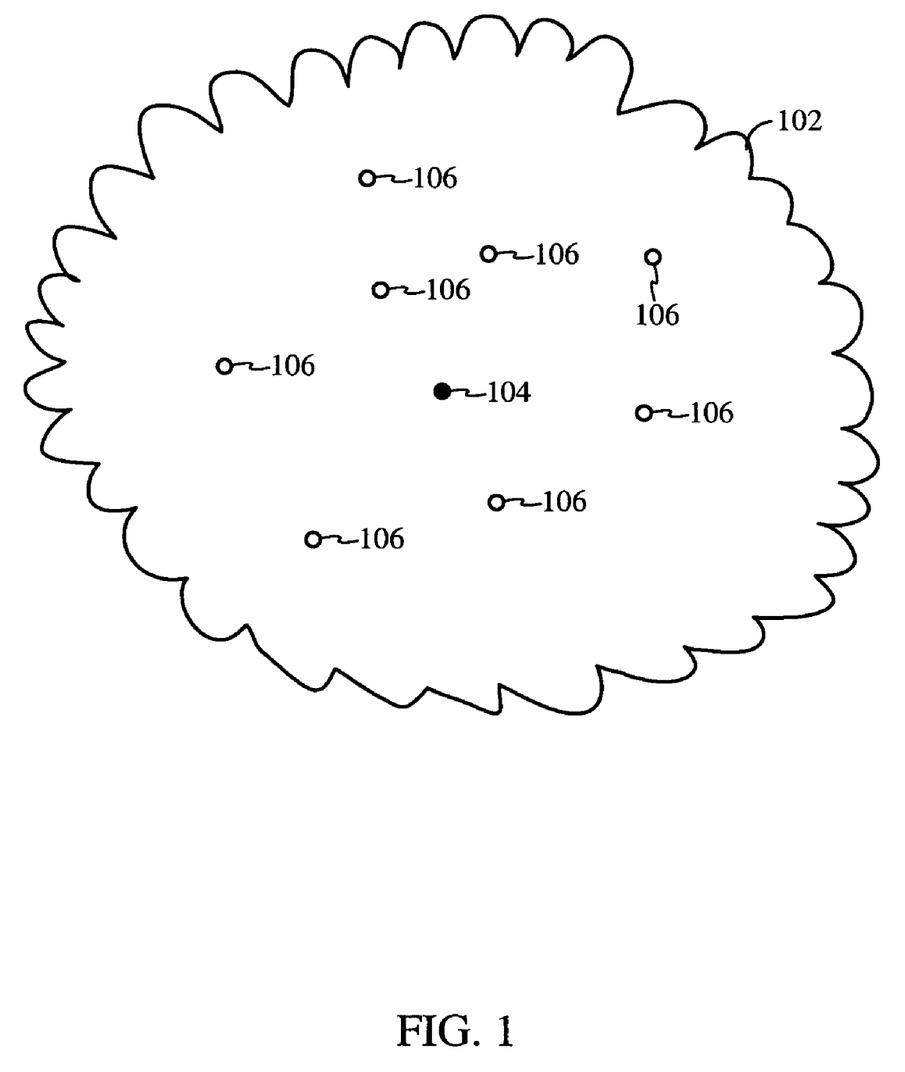
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. The terminals may be stationary or in motion, such as a terminal that is being carried by a user on foot or in a vehicle, aircraft or ship. The term "terminal" is intended to encompass various types of communications devices including cellular, PCS, wireless or landline phones, personal data assistants (PDA), laptops, external or internal modems, PC cards, and other similar devices.

In at least one embodiment of the wireless communications system, each piconet has one master terminal and a number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using any multiple access scheme, such as TDMA, FDMA, CDMA, or any other multiple access scheme. To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from piconet master terminals. The pilot signal broadcast by each piconet master terminal may be an unmodulated spread-spectrum signal, or some other reference signal. In spread-spectrum configurations, a psuedo-random noise (PN) code unique to each piconet master terminal may be used to spread the pilot signal. Using a correlation process, the terminal may search through possible PN codes to identify the master terminal with the strongest pilot signal. If the strongest pilot signal is received with sufficient signal strength to support a minimum data rate, then the terminal may attempt to join the piconet by registering with the master terminal.

A terminal may be unable to find a pilot signal because there is no master terminal. In some instances, a terminal may be unable to find a pilot signal of sufficient signal strength to support the minimum data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

The master terminal 104 may use a periodic frame structure to coordinate intra-piconet communications. This frame is often referred to in the art as a Medium Access Control (MAC) frame because it is used to provide access to the communications medium for various terminals. It would be apparent to those skilled in the art that a frame may be any duration depending on the particular application and overall design constraints.

For the purpose of discussion, a frame duration of approximately 5 ms will be used. An approximate 5 ms frame is reasonable to accommodate a high chip rate of approximately 650 Mcps and a desire to support data rates down to approximately 19.2 kbps.

Figure 2:
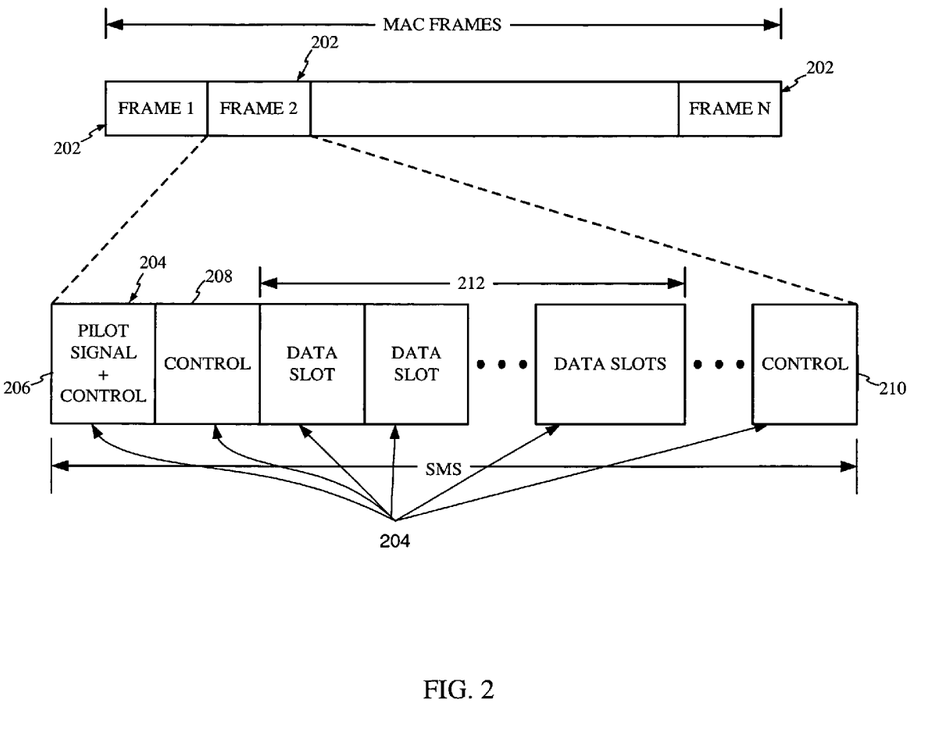
FIG. 2 is a conceptual diagram illustrating an example of a Medium Access Control (MAC) frame for controlling intra-piconet communications.

An example of a MAC frame structure is shown in FIG. 2 with n number of frames 202. Each frame may be divided into 160 or any other number of time slots 204. The slot duration may be approximately 31.25 μs, which corresponds to approximately 20,312.5 chips at approximately 650 Mcps. The frame may dedicate some of its slots for overhead. By way of example, the first slot 206 in the frame 202 may be used to broadcast the spread-spectrum pilot signal to the member terminals. The pilot signal may occupy the entire slot 206, or alternatively, be time shared with a control channel. The control channel occupying the end of the first slot 206 may be a spread-spectrum signal broadcast to all the member terminals at the same power level as the pilot signal. The master terminal may use this control channel to define the composition of the MAC frame.

The master terminal may be responsible for scheduling intra-piconet communications. This may be accomplished through the use of one or more additional spread-spectrum control channels which occupy various time slots within the frame, such as time slots 208 and 210 in FIG. 2. These additional control channels may be broadcast by the master terminal to all the member terminals and include various scheduling information. The scheduling information may include time slot assignments for communications between terminals within the piconet. As shown in FIG. 2, these time slots may be selected from the data slots portion 212 of the frame 202. Additional information, such as the power level and data rate for each communication between terminals, may also be included. The master terminal may also grant transmit opportunities in any given time slot to any number of terminal pairs using a CDMA scheme. In this case, the scheduling information may also assign the spreading codes to be used for the individual communications between terminals.

The master terminal may periodically set aside a fraction of time for peer-to-peer transmissions. During this time, the master terminal 104 may assign one of the member terminals 106 to communicate with one or more isolated terminals and/or adjacent piconets. These transmissions may require high transmit power, and in some instances, can only be sustained at low data rates. In the event that high power transmissions are needed to communicate with the isolated terminals and/or adjacent piconets, the master terminal may decide not to schedule any intra-piconet communications at the same time.

Figure 3:
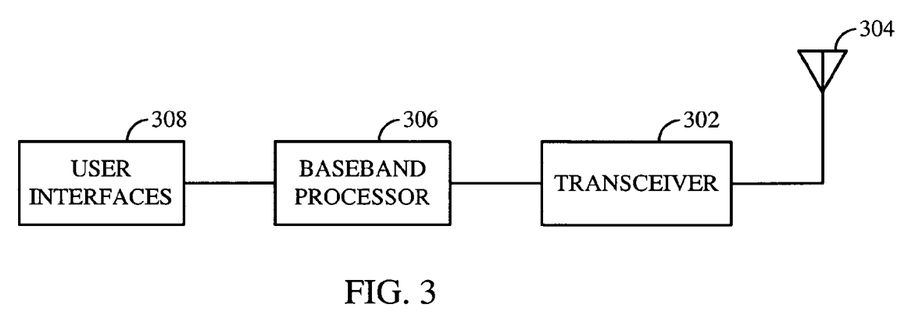
FIG. 3 is a functional block diagram illustrating an example of a terminal capable of operating within a piconet.

FIG. 3 is a conceptual block diagram illustrating one possible configuration of a terminal. As those skilled in the art will appreciate, the precise configuration of the terminal may vary depending on the specific application and the overall design constraints.

The terminal may be implemented with a front end transceiver 302 coupled to an antenna 304. A baseband processor 306 may be coupled to the transceiver 302. The baseband processor 306 may be implemented with a software based architecture, or any other type of architecture. A microprocessor may be used as a platform to run software programs that, among other things, provide executive control and overall system management functions that allow the terminal to operate either as a master or member terminal in a piconet. A digital signal processor (DSP) may be implemented with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 308 coupled to the baseband processor 306. The user interfaces may include a keypad, mouse, touch screen, display, ringer, vibrator, audio speaker, microphone, camera and/or other input/output devices.

Figure 4:
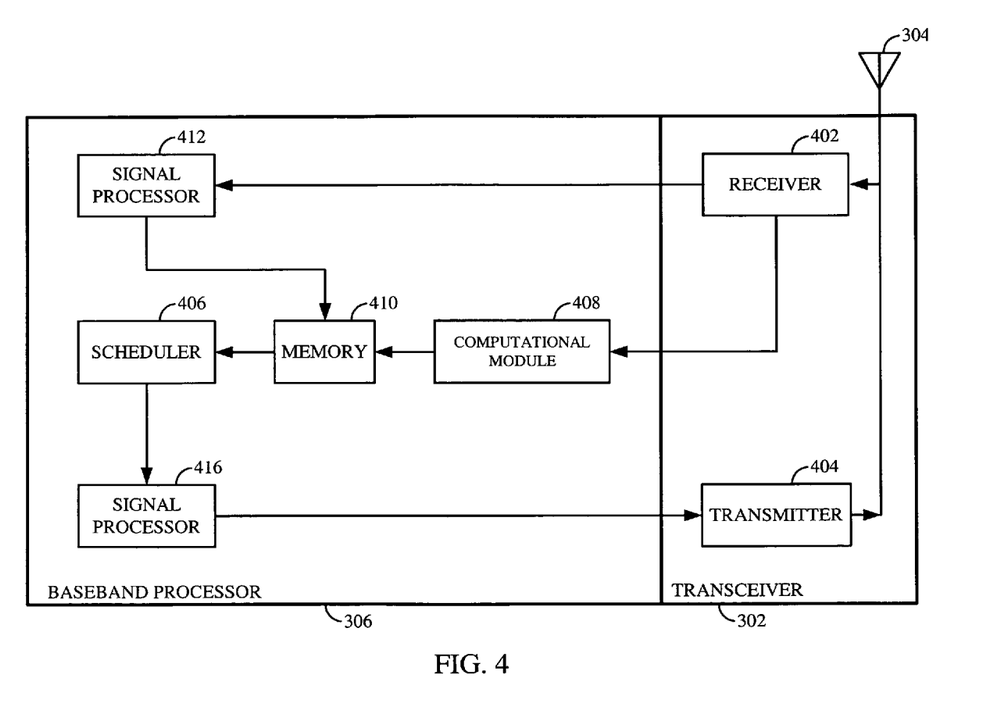
FIG. 4 is a conceptual block diagram illustrating an example of a terminal operating as a master terminal of a piconet.

FIG. 4 is a conceptual block diagram illustrating an example of a terminal operating as a master terminal. The baseband processor 306 is shown with the transceiver 302. The transceiver 302 may include a receiver 402. The receiver 402 provides detection of desired signals in the presence of noise and interference. The receiver 402 may be used to extract the desired signals and amplify them to a level where information contained in the received signal can be processed by the baseband processor 306.

The transceiver 302 may also include a transmitter 404. The transmitter 404 may be used to modulate information from the baseband processor 306 onto a carrier frequency. The modulated carrier may be upconverted to an RF frequency and amplified to a sufficient power level for radiation into free space through the antenna 304.

The baseband processor 306 may enable a scheduler 406 when operating as a master terminal. In the software based implementation of the baseband processor 306, the scheduler 406 may be a software program running on the microprocessor. However, as those skilled in the art will readily appreciate, the scheduler 406 is not limited to this embodiment, and may be implemented by any means known in the art, including any hardware configuration, software configuration, or combination thereof, which is capable of performing the various functions described herein.

The scheduler 406 may be used to schedule intra-piconet communications in a way that optimizes the capacity of the piconet. This may be achieved in a variety of ways. By way of example, the scheduler 406 may be used to carefully select the terminal pairs that will engage in simultaneous communications. A transmission power level may be scheduled for each of the simultaneous communications that satisfies a target quality parameter for each of the receiving terminals. The target quality parameter may be a desired carrier-to-interference (C/I) ratio at the receiving terminal, or any other quality parameter known in the art.

Figure 5:
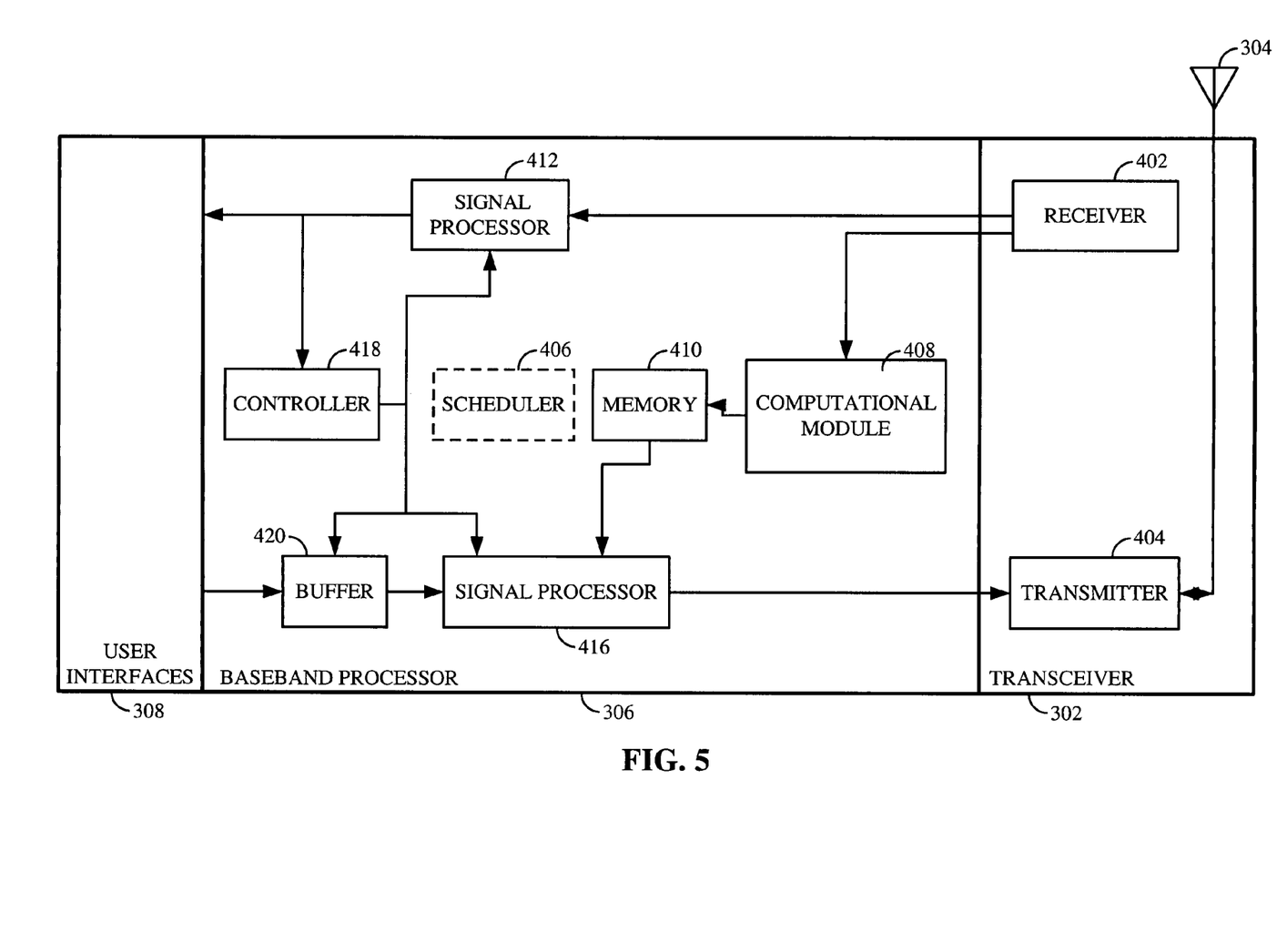
FIG. 5 is a conceptual block diagram illustrating an example of a terminal operating as a member terminal of the piconet.

FIG. 5 is a conceptual block diagram illustrating an example of a terminal operating as a member terminal. The scheduler 406 is shown with phantom lines illustrating that it is not enabled by the baseband processor 306 during operation as a member terminal. The configuration of the transceiver 302 is the same whether the baseband processor 306 is operating as a master or member terminal, and therefore, will not be discussed further. The transceiver 302 is shown in FIG. 5 for completeness.

As discussed earlier in connection with the baseband processor 306 configured as a master terminal, the scheduling assignments may be broadcast to all the member terminals in the piconet on one or more control channels. The signal processor 412 on the receiving end may employ spread-spectrum processing to extract the scheduling information from the control channel and provide it to a controller 418. The scheduling information may include the time slot assignments for the various transmissions to and from the member terminal, as well as the power level and data rate for each.

The controller 418 may be used to provide data rate and spreading information to the signal processor 412 on the receiving end for the scheduled transmissions to the member terminal. Using this information, the signal processor 412 may recover communications from other member terminals at the appropriate times and provide the recovered communications to the various user interfaces 308.

The controller 418 may also provide power level information to the computational module 408 for each transmission from another terminal. The computational module 408 may use this information to compute a path loss from the transmitting terminal by using the signal strength measurement from the transceiver 302 during scheduled transmissions. The path loss information computed by the computational module 408 may be stored in memory 410 and provided to the signal processor 416 on the transmitting end during the scheduled time for the control channel broadcast. In various embodiments of the terminal employing a GPS receiver (not shown), it may be used to provide coordinate information to the master terminal over a control channel broadcast via the signal processor 416 and the transceiver 302.

The signal processor 416 may be used to spread communications to various member terminals within the piconet. The communications may be originated from the various user interfaces 308 and stored in a buffer 420 until the scheduled transmission. At the scheduled time, the controller 418 may be used to release the communications from the buffer 420 to the signal processor 416 for spread-spectrum processing. The data rate, spreading code and transmission power level of the communications may be programmed into the signal processor 416 by the controller 418. Alternatively, the transmission power level may be programmed by the controller 418 at the transmitter 404 in the transceiver 302.

In an embodiment, communication between a terminal A and a terminal B is bidirectional. When terminal A sends signals other than a feedback signal to terminal B, terminal A is the transmitting terminal and terminal B is the receiving terminal. When terminal B sends signals other than a feedback signal to terminal A, terminal B is the transmitting terminal and terminal A is the receiving terminal.

Intermittent Transmission

Figure 6:
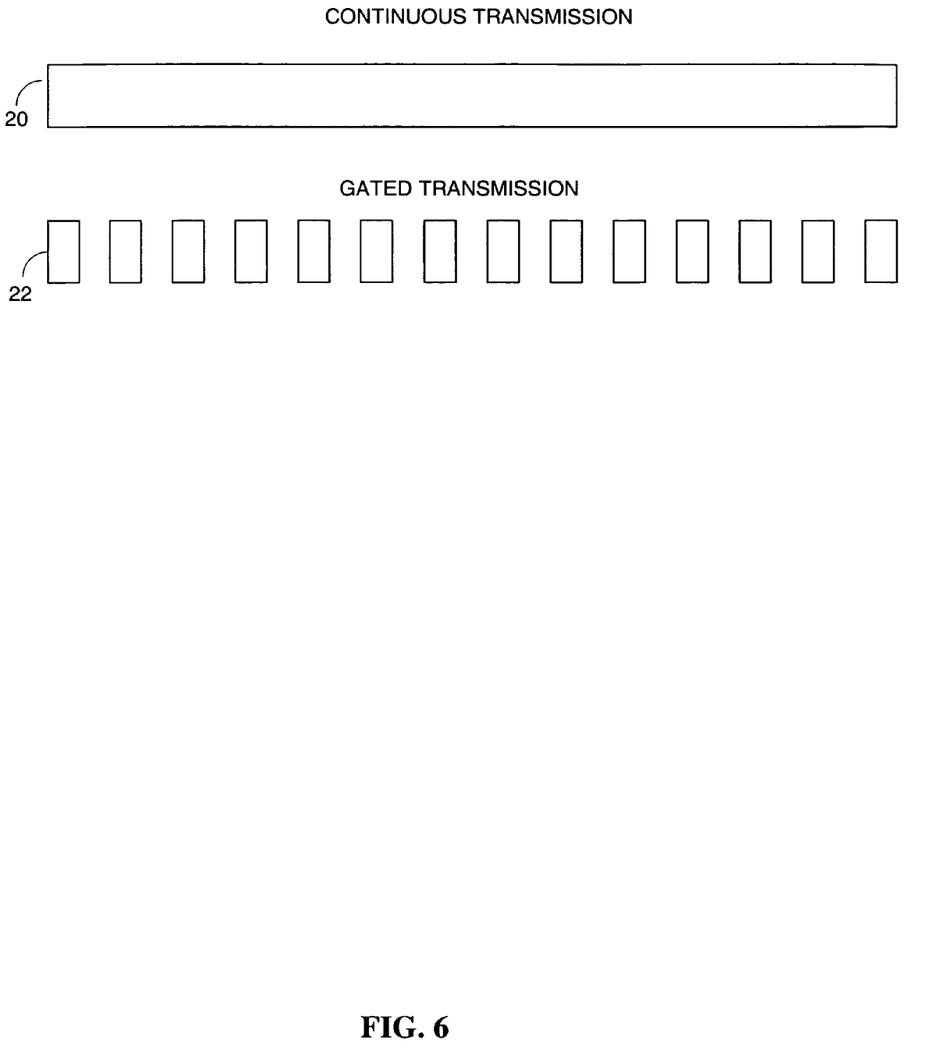
FIG. 6 shows an exemplary continuous transmission and an exemplary gated transmission in accordance with an embodiment.

A mechanism generally applicable to all modulation systems is the use of intermittent transmission, whether CMDA, OFDM or any other modulation method. Intermittent transmission means that transmitter transmission is gated. In an embodiment, the transmitter will transmit or shut off with some duty cycle. FIG. 6 shows an exemplary continuous transmission 20 and an exemplary gated transmission 22 in accordance with an embodiment. The gated signal includes a period of transmission followed by a period of no transmission.

A method is described below for system power consumption reduction through the use of transmit power greater than is required to achieve a required data rate. During the time of transmission the transmitter increases the transmit power by a selected amount and uses a higher physical layer data rate enabled by the increased transmit power. The duty cycle is selected to retain the original desired application layer data rate.

In an embodiment, the transmit power is increased 0.5 dB. In another embodiment, the transmit power is increased such that a next higher physical layer data rate is enabled. It would be apparent to those skilled in the art that the delta transmission power (i.e., the increase in transmit power) depends on the application and methods and techniques known in the art can be used to determine the delta transmission power.

In accordance with an embodiment, a reduction in power consumption may be achieved as illustrated through the following example. For this example, it is assumed that the Receive and Transmit powers are constants R and T, respectively, independent of the data rate. Treating transmit power as a constant T is justified where the radiated transmit power is a small part of overall transmit power consumption. Initial power is the sum or the Receive and Transmit powers:

$$P_{initial} = R + T.$$

Introducing the intermittent transmission power with duty cycle d<1, intermittent transmission power is calculated as shown below.

$$P_{intermittent} = d*R + d*T = d*P_{initial}$$

A reduction in power consumption with intermittent transmission depends on the duty cycle ration d. The duty cycle d in turn is determined by the requirement to maintain the original application data rate $r_{initial}$. $r_{initial}$ is also called the initial physical layer data rate.

$$d = r_{initial}/r_{final}$$

where $r_{final}$ is the new physical layer data rate (i.e., final physical layer data rate) supported at the enhanced transmit power level.

In accordance with an embodiment, given a transmitting terminal already having gated transmissions, and further increases (or decreases) to transmit power, then the application data rate $a = d_{initial}*r_{initial} = d_{final}*r_{final}$.

The reduction in power consumption depends on the duty cycle ratio d and the d in turn depends on the operational SNR and the system performance. If a terminal is operating in a high signal-to-interference-and-noise ration (SINR) regime with SINR>>1 then the benefit from increasing the transmit power is smaller. For example a 3 dB increase in transmit power when operating with SINR>>1 will result in ½<<d<1, resulting is only a small reduction in power consumption. In contrast, if a terminal is operating in a low SINR regime with SINR<<1 then a 3 dB increase in transmit power allows for a selecting d=0.5, which can mean a power consumption reduction of up to 50%.

Computing $r_{final}$

The value of $r_{final}$ depends on the system performance and in any specific implementation of this invention the system performance curve would be used. However if exact system performance curves are not available, a method based on Shannon capacity may be used to determine $r_{final}$.

According to the Shannon capacity formula the maximum error free data rate c for an additive white Gaussian noise channel (AWGN) is given by the equation $$c=W \log (1+SINR),$$

where W is the bandwidth of the channel in Hz.

The actual data rate r may be approximated as $$r=W \log (1+SINR-L)$$

where L is the aggregate of all implementation losses. The deviation of the actual system performance from the theoretical best achievable performance is an implementation loss.

Figure 7:
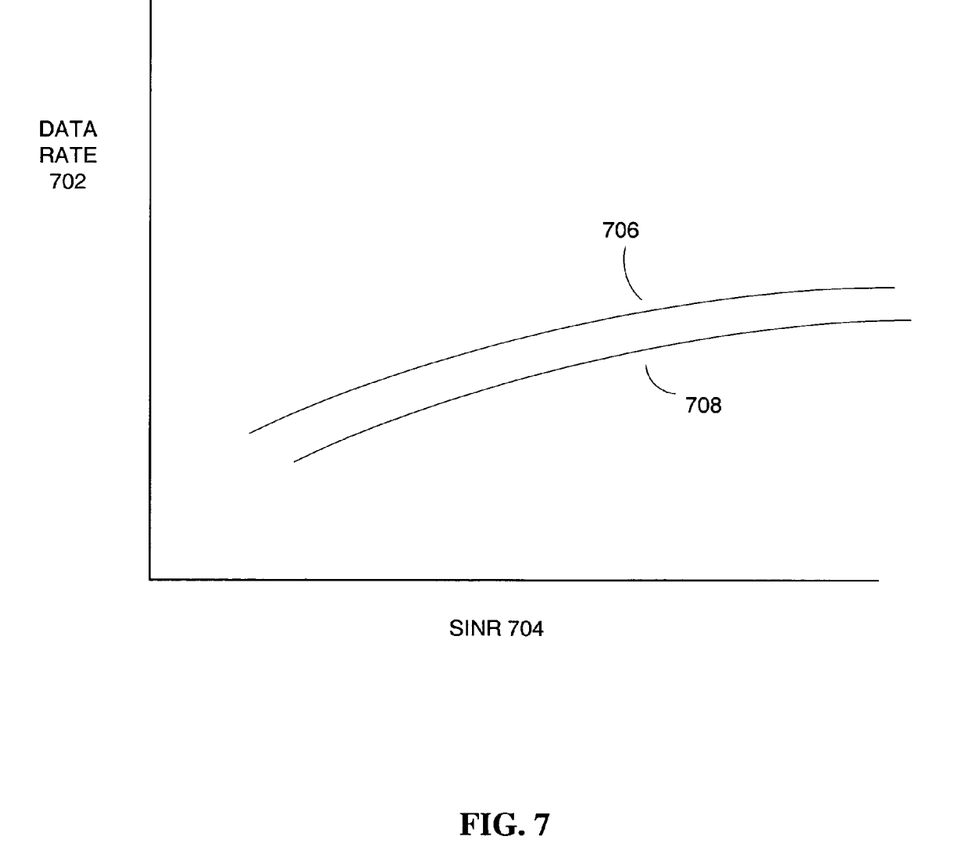
FIG. 7 shows a graph of a data rate as a function of the signal-to-interference-and-noise ratio (SINR) in accordance with an embodiment.

FIG. 7 shows a graph of a data rate 702 as a function of the SINR 704 in accordance with an embodiment. The theoretical best achievable performance 706 in data rate as a function of SINR is shown as a curve 706 in accordance with an embodiment. The function of data rates as a function of SINR after accounting for implementation losses is shown as curve 708 in accordance with an embodiment.

Let $SINR_i$ and $SINR_f$ be the initial and final values of the SINR yielding the data rates $r_i$ and $r_f$, respectively. Then, $$r_f = r_i * \log (1+SINR_f-L)/\log (1+SINR_i-L).$$

The above equation allows the estimation of the new data rate $r_f$ that is to be used when the SINR is changed from $SINR_i$ to $SINR_f$.

An exemplary definition of supported data rates and decode thresholds in accordance with an embodiment is illustrated in Table 1.

processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but

TABLE 1

Traffic Channel Parameters

| Parameter | Data Rates Kbps | | | | | | | | | |
|---|---|---|---|---|---|---|---|---|---|---|
| | 38.4 | 76.8 | 153.6 | 307.2 | 307.2 | 614.4 | 614.4 | 1228.8 | 1228.8 | 1843.2 | 2457.6 |
| Threshold (dB) | −11.5 | −9.7 | −6.8 | −3.9 | −3.8 | −0.6 | −0.8 | 1.8 | 3.7 | 7.5 | 9.7 |

It would be understood by those skilled in the art that a different definition of the supported data rates can be contemplated and are within the scope of the present invention. It would also be understood by those skilled in the art that the use of any number of supported data rates and other data rates than those listed in Table 1 can be contemplated and is within the scope of the invention.

Table 1 shows the C/I thresholds required to decode each data rate at a 1% packet error rate (PER) in accordance with an embodiment. PER=#badpackets/#goodpackets The forward link has a limited rate set and the thresholds required to decode a packet successfully 1% of the time for consecutive rates have a gap of as much as 3.7 dB, for example. If an estimated C/I is greater than that required for the highest rate, a transmitting terminal can reduce its transmit power.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose is to be accorded the widest scope consistent with the principles and novel features disclosed herein.

What is claimed is:

1. A method of gating wireless transmissions, comprising:
   increasing transmit power by a delta transmit power;
   determining a final physical layer data rate $r_{final}$ based on the increased transmit power and system performance;
   determining a duty cycle based on maintaining an original application data rate given the final physical layer data rate $r_{final}$; and
   gating the wireless transmissions based on the duty cycle.

2. The method of claim 1, further comprising increasing the transmit power such that a next higher physical layer data rate is enabled.

3. The method of claim 1, wherein the duty cycle is based on the ratio of the original application data rate over the final physical layer data rate $r_{final}$.

4. The method of claim 3, wherein the physical layer data rate $r_{final}$ is based on a signal-to-interference-and-noise ratio (SINR).

5. The method of claim 4, wherein the physical layer data rate $r_{final}$ is further based on implementation losses.

6. A wireless terminal, comprising:
means for increasing transmit power by a delta transmit power;
means for determining a final physical layer data rate $r_{final}$ based on the increased transmit power and system performance;
means for determining a duty cycle based on maintaining an original application data rate given the final physical layer data rate $r_{final}$; and
means for gating the wireless transmissions based on the duty cycle.

7. A wireless terminal, comprising:
a receiver for detecting signal-to-interference-and-noise ratio (SINR);
a processor for determining a duty cycle based on maintaining an original application data rate given the SINR and an increase in transmit power, the processor coupled to the receiver; and
a transmitter for gating the wireless transmissions based on the duty cycle, the transmitter coupled to the baseband processor.

8. Computer readable media embodying a program of instructions executable by a computer program, said computer readable media comprising:

a computer readable program code means for increasing transmit power by a delta transmit power;
a computer readable program code means for determining a final physical layer data rate $r_{final}$ based on the increased transmit power and system performance;
a computer readable program code means for determining a duty cycle based on maintaining an original application data rate given the final physical layer data rate $r_{final}$; and
a computer readable program code means for gating the wireless transmissions based on the duty cycle.

* * * * *